(12) United States Patent
Zeng et al.

(10) Patent No.: US 10,003,489 B2
(45) Date of Patent: Jun. 19, 2018

(54) COMMUNICATION DEVICE USING A SPECTRAL SHAPED LOW PEAK-TO-AVERAGE POWER DISCRETE FOURIER TRANSFORM WAVEFORM

(71) Applicant: QUALCOMM Incorporated, San Diego, CA (US)

(72) Inventors: Wei Zeng, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/448,875

(22) Filed: Mar. 3, 2017

(65) Prior Publication Data

US 2018/0048512 A1     Feb. 15, 2018

Related U.S. Application Data (60) Provisional application No. 62/374,302, filed on Aug. 12, 2016.

(51) Int. Cl.
*H04L 27/26* (2006.01)
*H04L 27/34* (2006.01)
(Continued)

(52) U.S. Cl.
CPC ........ *H04L 27/3411* (2013.01); *H04B 1/0475* (2013.01); *H04L 27/206* (2013.01);
(Continued)

(58) Field of Classification Search
CPC ............. H04L 27/3411; H04L 27/2627; H04L 27/2621; H04L 27/206; H04L 27/2636; H04B 1/0475

See application file for complete search history.

(56) References Cited

U.S. PATENT DOCUMENTS 8,532,084 B2 * 9/2013 Popovic .............. H04L 27/2655
370/208
2005/0286620 A1 * 12/2005 Peng ........................ H04L 5/14
375/222
(Continued)

FOREIGN PATENT DOCUMENTS

EP          1868336 A2     12/2007
WO      2007048278 A1      5/2007

OTHER PUBLICATIONS

International Search Report and Written Opinion—PCT/US2017/044212—ISA/EPO—dated Nov. 3, 2017.
(Continued)

*Primary Examiner* — Dac Ha
(74) *Attorney, Agent, or Firm* — Arent Fox LLP (57) ABSTRACT

The apparatus may be a transmitter. The transmitter including a modulator configured to modulate a binary input sequence with a particular modulation coding scheme to generate a modulated input signal. The transmitter also including a spectral shaping circuit configured to spectral shape a first version of the input signal to generate a spectral shaped signal. The spectral shaping circuit also includes a FIR filter configured to lower peak-to-average power ratio of the spectral shaped signal. The transmitter also includes a discrete Fourier transform circuit configured to discrete Fourier transform a second version of the input signal to generate a discrete Fourier transformed signal. The modulated input signal is one of the first version of the input signal or the second version of the input signal and the spectral shaped signal is another of the first version of the input signal or the second version of the input signal.

23 Claims, 7 Drawing Sheets

(51) Int. Cl.
*H04L 27/20* (2006.01)
*H04B 1/04* (2006.01)

(52) U.S. Cl.
CPC ...... *H04L 27/2621* (2013.01); *H04L 27/2627* (2013.01); *H04L 27/2636* (2013.01)

(56) References Cited

U.S. PATENT DOCUMENTS

| | | | |
|---|---|---|---|
| 2007/0004465 A1* | 1/2007 | Papasakellariou .. | H04W 52/282 455/571 |
| 2007/0081604 A1 | 4/2007 | Khan et al. | |
| 2007/0084604 A1* | 4/2007 | Haney .................. | E21B 43/117 166/298 |
| 2014/0140452 A1* | 5/2014 | Gandhi ................ | H04B 1/0475 375/346 |
| 2014/0161154 A1* | 6/2014 | Hadani ................. | H04L 5/0016 375/138 |
| 2017/0134205 A1* | 5/2017 | Kim .................... | H04L 27/2082 |

OTHER PUBLICATIONS

Qualcomm Incorporated: "Waveform Candidates", 3GPP Draft; R1-162199, 3rd Generation Partnership Project (3GPP), vol. RAN WG1, No. Susan, Korea; Apr. 2, 2016, XP051080027, Retrieved from the Internet: URL:http://www.3gpp.org/ftp/tsg_ran/WG1_RL1/TSGR1_84b/Does/ [retrieved on Apr. 2, 2016], 26 pages.

* cited by examiner

COMMUNICATION DEVICE USING A SPECTRAL SHAPED LOW PEAK-TO-AVERAGE POWER DISCRETE FOURIER TRANSFORM WAVEFORM

CROSS-REFERENCE TO RELATED APPLICATION(S)

This application claims the benefit of U.S. Provisional Application Ser. No. 62/374,302, entitled "COMMUNICATION DEVICE USING A SPECTRAL SHAPED LOW PEAK-TO-AVERAGE POWER DISCRETE FOURIER TRANSFORM WAVEFORM" and filed on Aug. 12, 2016, which is expressly incorporated by reference herein in its entirety.

BACKGROUND

Field

The present disclosure relates generally to communication systems, and more particularly, to a spectral shaped low peak-to-average power discrete Fourier transform waveform for communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method and an apparatus are provided. The apparatus may be a transmitter. The transmitter includes a modulator configured to modulate a binary input sequence with a particular modulation coding scheme to generate a modulated input signal. The transmitter also includes a spectral shaping circuit configured to perform a spectral shaping of a first version of the input signal to generate a spectral shaped signal, the spectral shaping circuit including a finite input response (FIR) filter configured to lower peak-to-average power ratio of the spectral shaped signal. The transmitter also includes a discrete Fourier transform circuit configured to discrete Fourier transform a second version of the input signal to generate a discrete Fourier transformed signal. The modulated input signal is one of the first version of the input signal or the second version of the input signal and the spectral shaped signal is another of the first version of the input signal or the second version of the input signal In another aspect, the transmitter includes means for modulating a binary input sequence with a particular modulation coding scheme to generate a modulated input signal, Additionally, the transmitter includes means for performing a spectral shaping of a first version of the input signal to generate a spectral shaped signal, the spectral shaping including an FIR filter configured to lower peak-to-average power ratio of the spectral shaped signal. The transmitter also includes means for performing a M-point discrete Fourier transforming of a second version of the input signal to generate a discrete Fourier transformed signal. The modulated input signal is one of the first version of the input signal or the second version of the input signal and the spectral shaped signal is another of the first version of the input signal or the second version of the input signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, the concepts may be practiced without the specific details. In some instances, well known structures and components are shown in block diagram form in order to avoid obscuring such concepts.

Several aspects of telecommunication systems will now be presented with reference to various apparatus and methods. The apparatus and methods will be described in the following detailed description and illustrated in the accompanying drawings by various blocks, components, circuits, processes, algorithms, etc. (collectively referred to as "elements"). The elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
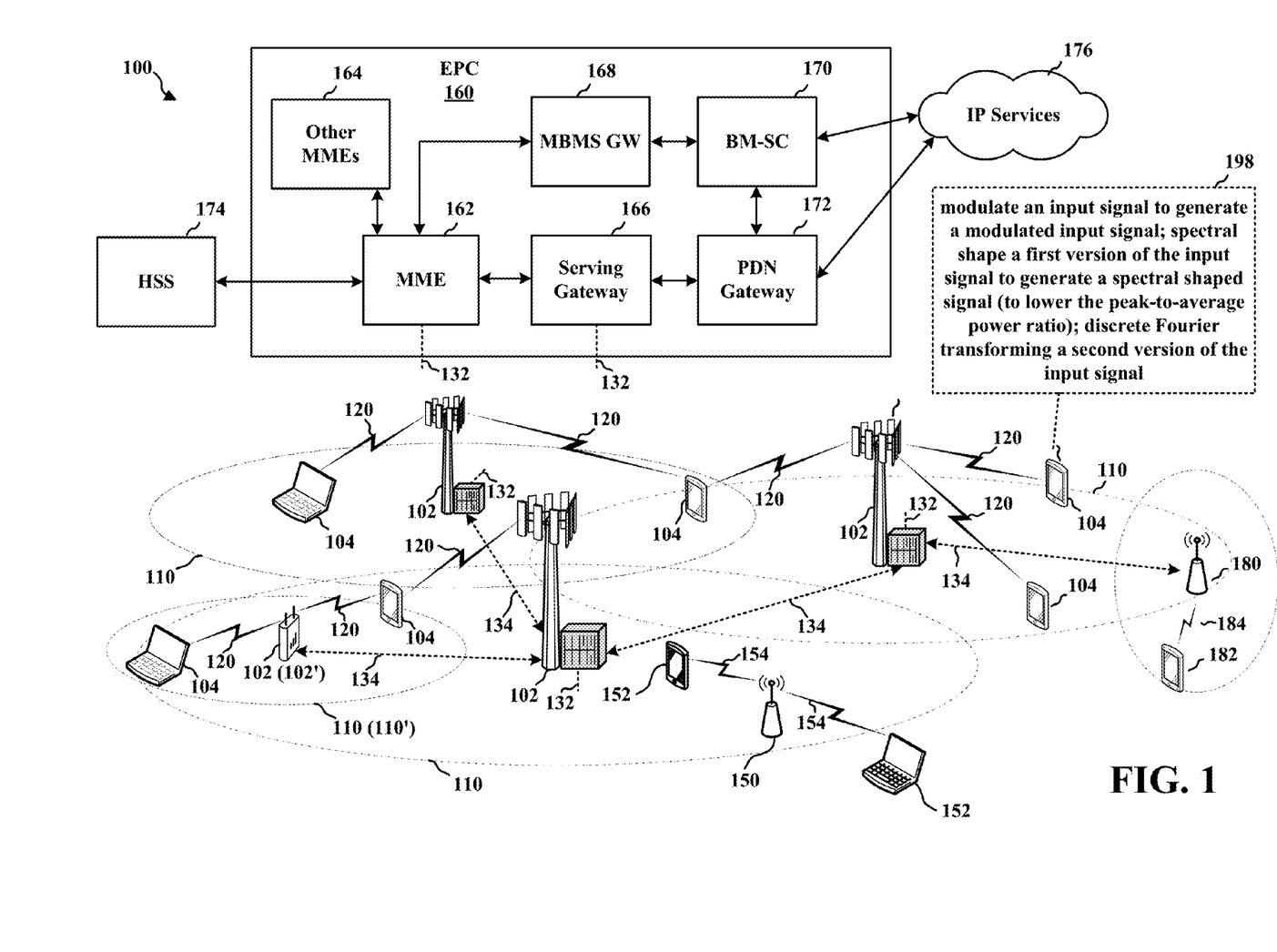
FIG. 1 is a diagram illustrating an example of a wireless communications system and an access network.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to modulate a binary input sequence with a particular modulation coding scheme to generate a modulated input signal. The UE 104 may also be configured to perform a spectral shaping of a first version of the input signal to generate a spectral shaped signal. The spectral shaping includes an FIR filter configured to lower peak-to-average power ratio of the spectral shaped signal. Additionally, the UE 104 may also be configured to perform a M-point discrete Fourier transform on a second version of the input signal to generate a discrete Fourier transformed signal (198).

Figure 2A:
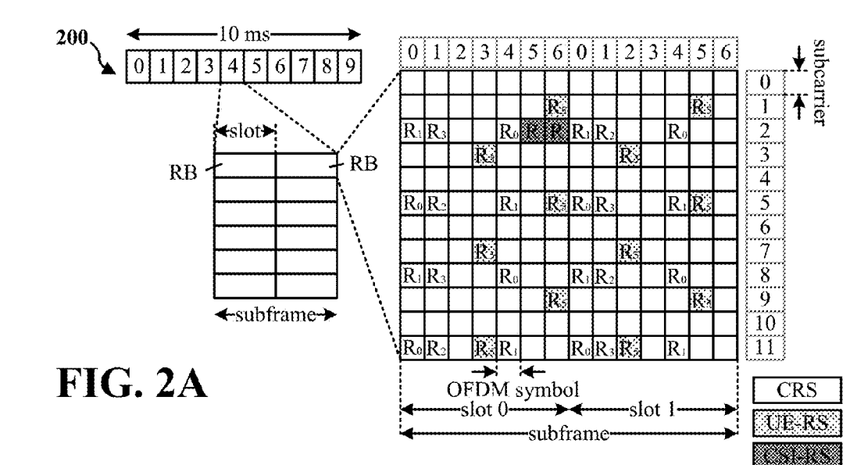
FIGS. 2A, 2B, 2C, and 2D are diagrams illustrating LTE examples of a DL frame structure, DL channels within the DL frame structure, an UL frame structure, and UL channels within the UL frame structure, respectively.
Figure 2B:
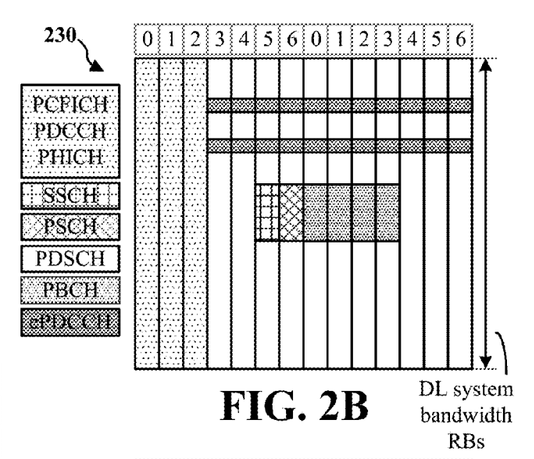
Figure 2C:
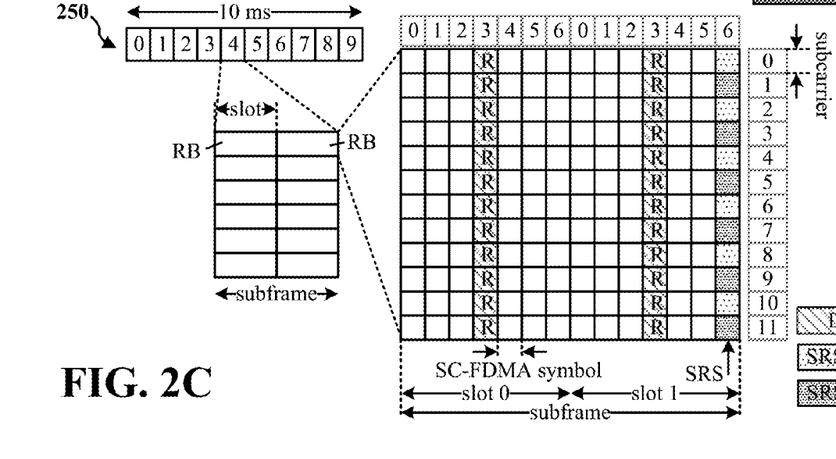
Figure 2D:
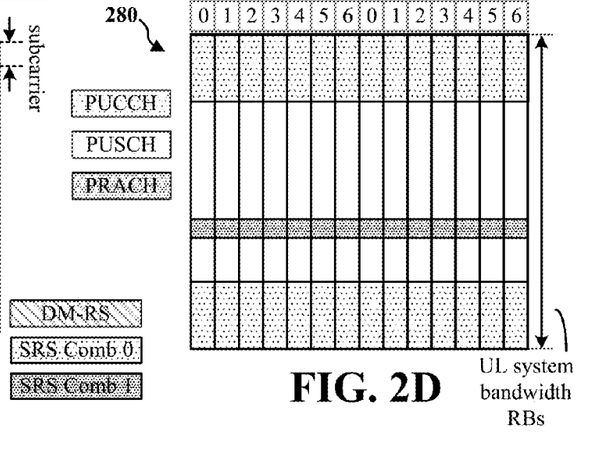

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDMA symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDMA symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
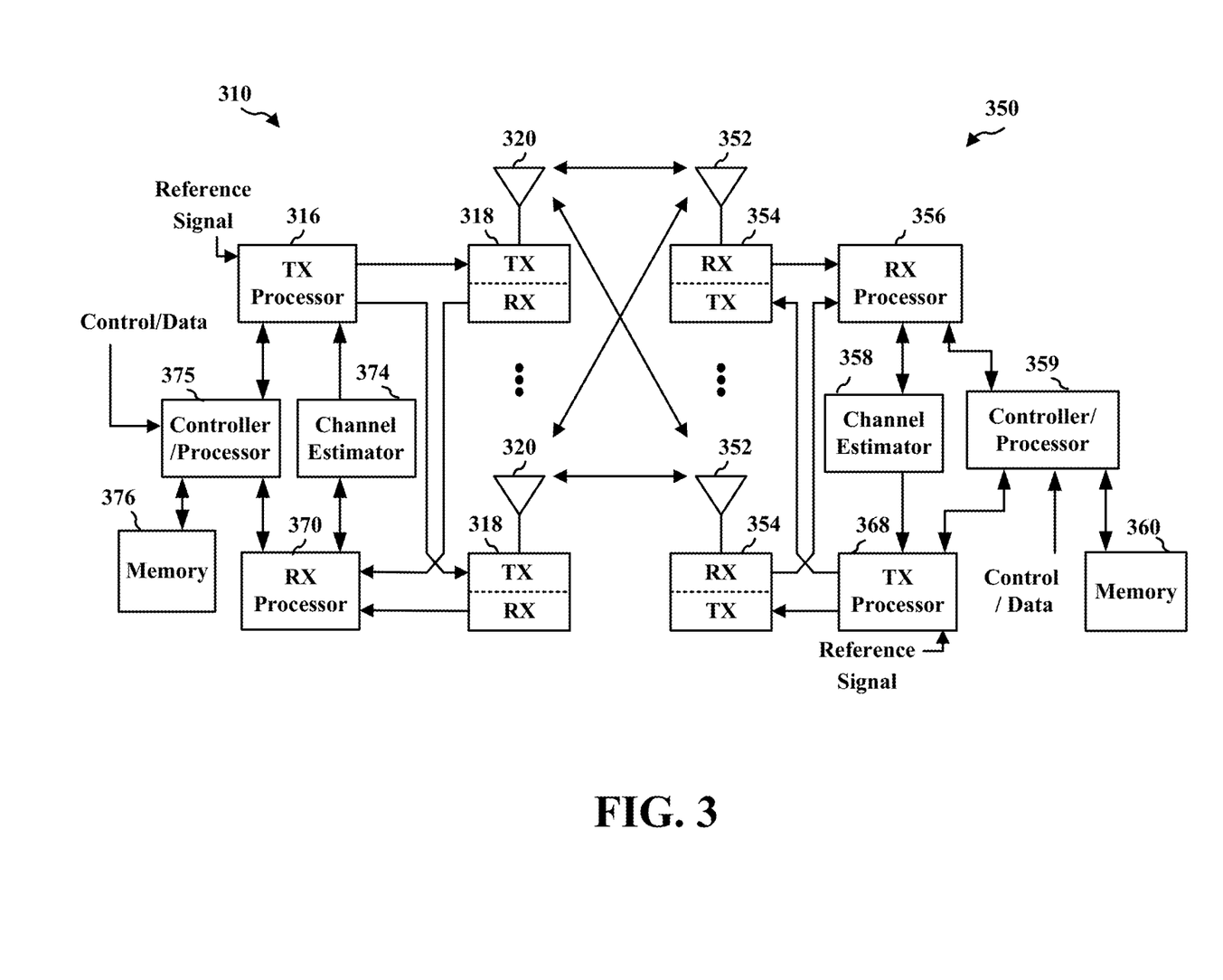
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDMA subcarrier, multiplexed with a reference signal (e.g., pilot) in the time and/or frequency domain, and then combined together using an Inverse Fast Fourier Transform (IFFT) to produce a physical channel carrying a time domain OFDMA symbol stream. The OFDMA stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDMA symbol stream. The RX processor 356 then converts the OFDMA symbol stream from the time-domain to the frequency domain using a Fast Fourier Transform (FFT). The frequency domain signal comprises a separate OFDMA symbol stream for each subcarrier of the OFDMA signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
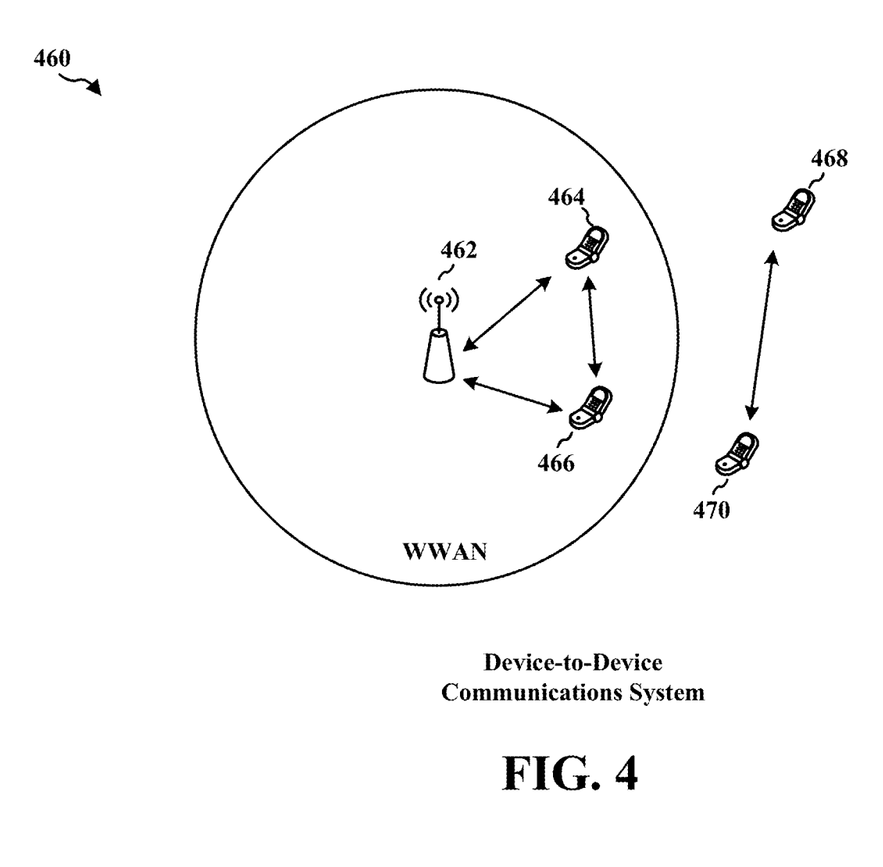
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

The systems and methods described herein may be used in conjunction with an LTE communications system, such as the LTE communications system described above, to provide for low peak-to-average (PAPR) modulation as one example. Additionally, the systems and methods described herein may be applied to other communications system to provide for low PAPR modulation. For example, any modulation scheme, and particularly, modulation schemes that are already low PAPR modulation schemes before spectral shaping, may be used. Examples of modulation schemes that are low PAPR modulation schemes before spectral shaping include, but are not limited to, Pi/2 Binary Phase Shift Keying (BPSK), Quadrature Phase Shift Keying (QPSK), and Offset QPSK (OQPSK), to name a few examples. Wireless devices, including both D2D devices and non-D2D devices, may include transmitters as described below.

There may be a large potential market for a class of devices that may transmit small amounts of data using, for example, a cellular network. The class of devices may have very low energy consumption. Some example devices that may transmit small amounts of data over a cellular network include smart meters, smart sensors, environment monitoring sensors, and other monitoring systems, devices, or sensors. The devices may be battery operated and may be designed to run on a battery power for, e.g., several years without having to recharge or replace the battery. Because the amount of data transmitted may be low, high spectral efficiency may not be required for the devices.

Next generation cellular networks may support large numbers of such devices in example systems. (Although the systems and methods described herein may be applied to current cellular networks.) The cellular network used may extend coverage for the devices. Extended coverage for the devices may allow for cellular networks with fewer cells.

In some examples, devices may be deployed in basements, which may incur a large penetration loss when communicating with a base station that may cover a large cell radius. As a result, the communication path between the device and the base station may have a large propagation loss. Accordingly, a waveform and/or a modulation that achieves high power amplifier (PA) efficiency may be needed to provide a transmitter that uses relatively low power to perform any transmissions needed.

A pure single carrier waveform with low PAPR modulation for internet of everything (IOE) devices, such as the constant envelope waveforms used in 2G cellular systems, may be deployed in cellular networks. The pure single carrier waveform with low PAPR modulation may have relaxed timing requirements and simple waveform synthesis. However, such a single-carrier waveform may not integrate seamlessly in-band with other IFFT-based waveforms used by other services, such as the OFDM waveform used for high throughput data transactions.

Thus, communication in a wireless network using an IFFT-based (e.g. OFDMA or DFT-spread-OFDMA) waveform with low PAPR may be desirable. A system using an IFFT-based (e.g. OFDMA or DFT-spread-OFDMA) waveforms with low PAPR may be multiplex with other services (e.g. enhanced mobile broadband (eMBB)) using IFFT-based waveforms. However, IFFT-based waveforms such as orthogonal frequency division multiple access (OFDMA), single carrier frequency division multiple access (SC-FDMA), and single carrier quadrature phase shift keying (SC-QPSK) may have a high PAPR, for example:

OFDMA: >9 dB at 10^-4 PAPR CDF
SC-FDMA: ~7 dB at 10^-4 PAPR CDF
SC-QPSK: ~5 dB at 10^-4 PAPR CDF

The systems and methods described herein may provide for efficient low energy transmissions in a wireless communication system and/or a wireless communication network. In some aspects any low PAPR modulation that couples well with Rate-Splitting Multiple Access (RSMA) may be used.

Figure 5:
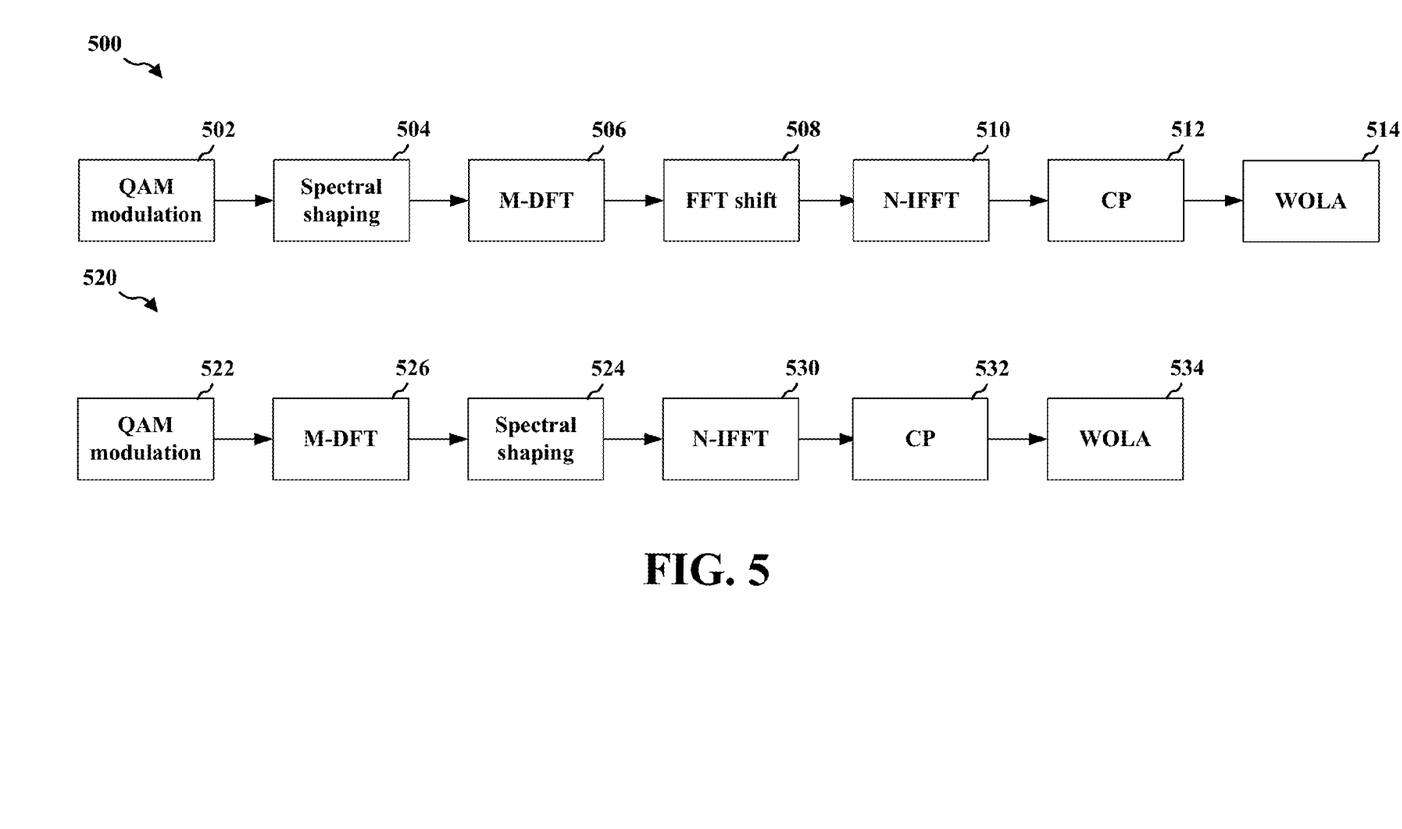
FIG. 5 is a block diagram illustrating two example systems that may provide spectral shaped low PAPR DFT-spread OFDM waveforms.

FIG. 5 is a block diagram illustrating two example systems that may provide spectrally shaped low PAPR DFT-spread OFDM waveforms. Either of the block diagrams may have, as an input, a binary signal that may be after channel encoding, spreading, and scrambling. In example transmitter 500, the binary sequence may first be modulated, e.g., using quadrature amplitude (QAM) modulation. After QAM modulation, the modulated signal may be spectrally shaped. The spectrally shaped signal may then be processed by a DFT-spread OFDMA synthesis chain, e.g., discrete Fourier transformed from the time domain to the frequency domain. The OFDMA synthesis chain may include a fast Fourier transform (FFT) shift. The fast Fourier transform (FFT) shift may be a circular shift, e.g., $e^{2 \cdot \pi \cdot i \cdot n \cdot m / N}$. A circular shift equivalent to half the number of allocated tones may be needed in order to maintain low PAPR for certain type of input signals. Note that such a circular shift is equivalent to inverting every even or every odd numbered input samples before the DFT. Whenever the input sample statistics is invariant under such sample inversion, e.g. in the case of QPSK or BPSK input signals without spectrum shaping, the circular shift operation may be skipped. In other cases, for example Pi/2 BPSK with spectrum shaping, the circular shift operation should be performed.

The OFDMA synthesis chain may include an N point inverse FFT (IFFT) to convert the frequency domain signal back to the time domain. The OFDMA synthesis chain may also include a cyclic prefix block/circuit to add a cyclic prefix to the time domain signal. The cyclic prefix may act as a guard interval to protect the OFDM signals from intersymbol interference. The cyclic prefix block may create the cyclic prefix by preceding each OFDM symbol with a copy of an end portion of that same symbol. The cyclic prefix may be added to the time domain signal output from the N-IFFT block 510. Optionally, a weighted overlap-add (WOLA) operation also sometimes referred to as a weighted overlap and add, e.g., in WOLA block 514, may be used to reduce out of band emissions that may interfere with the demodulation of the transmitted waveform. In the WOLA operation, a synthesis window may be applied to an input signal prior to an overlap-add to create an output signal.

In the example transmitter 520, the binary sequence may first be modulated, e.g., using QAM modulation. After QAM modulation, a DFT may be performed on the modulated signal to convert the signal from the time domain to the frequency domain. The DFT signal, which is in the frequency domain, may then be spectrally shaped. In the frequency domain, the spectral shaping may be an element wise, e.g., obtained by operating on one element at a time, multiply with the frequency domain impulse response of an FIR filter. The spectrally shaped signal may then be processed by an N point IFFT to convert the signal from the frequency domain back to the time domain. Once the signal has been converted back to the time domain, a cyclic prefix operation may be performed to add a cyclic prefix to the signal. Optionally, a WOLA operation, e.g., in WOLA block 514, may be used to reduce out of band emission.

FIG. 5 illustrates a pair of example transmitters 500, 520. The transmitter 500 may include a modulator (e.g., QAM modulation block 502). The QAM modulation block 502 may be configured to QAM an input signal. For example, the QAM modulation block 502 may modulate a binary input sequence with a particular modulation coding scheme to generate a modulated input signal, e.g., a QAM modulation coding scheme to generate a QAM modulated input signal.

The QAM modulation coding scheme may be one of an analog QAM modulation scheme or a digital QAM modulation scheme, depending on the particular implementation, e.g., analog or digital. The QAM modulation coding scheme may convey one of two analog message signals or two digital bit streams. The two analog message signals or two digital bit streams may be generated by modulating amplitudes of two carrier waves. For example, the two carrier waves may be modulate using an amplitude-shift keying (ASK) digital modulation scheme or an amplitude modulation (AM) analog modulation scheme. As such, the two analog message signals may be modulated using ASK digital modulation or two digital message signals may be modulated using AM analog modulation.

Additionally, the transmitter 500 may include a spectral shaping block 504. The spectral shaping block 504 may be configured to perform a spectral shaping of a first version of the input signal to generate a spectral shaped signal. For example, in the transmitter 500, the spectral shaping block 504 may be configured to perform a spectral shaping of the output of the QAM modulation block 502. Accordingly, in the transmitter 500, the spectral shaping block 504 may be configured to spectrally shape a QAM modulated input signal of the transmitter 500. The QAM modulated output signal may be an output signal of the QAM modulation block 502. Accordingly, in the example transmitter 500, the QAM modulated input signal may be a first version of the input signal.

Spectral shaping may refer to a modification of a signal to achieve a desired spectral response. For example, for spectral shaping, the spectral shaping circuitry may attenuate in-band portions of a signal near corner frequencies of the spectral shaping circuitry. In an example, the spectral shaping circuitry may be a digital band-pass filter or an analog band-pass filter. The digital band-pass filter or an analog band-pass filter may attenuate the signal strength in the attenuation bandwidths (ABW) by attenuation (A), and pass the signal strength within the passband (PB). The attenuation bandwidths ABW may be adjacent to the corner frequencies and in-band. Accordingly, the ABW may be within a signal bandwidth (BW). The spectral shaping block 504 may include an FIR filter configured to lower peak-to-average power ratio of the spectral shaped signal.

The transmitter 500 may also include a M-point discrete Fourier transform circuit (M-DFT) 506 configured to discrete Fourier transform a second version of the input signal to generate a discrete Fourier transformed signal. For example, a discrete Fourier transform block 506 may be configured to transform a time domain version of a component of the digital signal to a frequency domain version of the component of the digital signal.

The transmitter 500 may also include an FFT shift block 508. The FFT shift block 508 may be configured to FFT shift an input. For example, an FFT shift may be performed by multiplying an input to the FFT shift block 508 by a ±1 sequence. For example, the FFT shift block 508 may perform the FFT shift by multiplying by $(-1)^n$, where n is a series of integers that lead to the generation of the ±1 sequence. For example, for n=1, 2, 3, . . . ; $(-1)^n=(-1)^1$, $(-1)^2$, $(-1)^3$, . . . ; which is: −1, 1, −1

The transmitter 500 may also include an N-IFFT block 510. The N-IFFT block 510 may be configured to transform a frequency-domain input signal, e.g., the signal from the FFT shift block 508 into a time-domain signal. For example, an output of the FFT shift block 508 may be transformed from the frequency-domain to the time domain by the N-IFFT block 510.

The transmitter 500 may also include a CP block 512. The CP block 512 may be configured to add a cyclic prefix (e.g., a guard interval) to, for example, reduce intersymbol interference. For example, the CP block 512 may add a guard interval (e.g., cyclic prefix) a serial stream of digital bits. For example, the CP block 512 may add a cyclic prefix to each OFDM symbol, e.g., each OFDM symbol from the N-IFFT block 510, to reduce inter-OFDM-symbol interference.

The transmitter 500 may also include a weighted overlap and add block (WOLA) 514. The WOLA block 514 may be configured to perform weighted overlap and add (WOLA) filtering in accordance with some aspects of the disclosure. For example, the WOLA block 514 may WOLA filter the output of the CP block 512 to provide a filtered output signal for transmission.

The signal immediately output by the QAM modulation block 502, may be referred to as the "modulated signal." The signal output by the spectral shaping block 504 may be referred to as the "spectral shaped signal." The signal output by the M-DFT block 506 may be referred to as the "DFT spread signal." The signal output by the FFT shift block 508 (e.g., a half-cyclic shift block) may be referred to as the "FFT shifted signal" or the "half-cyclic shifted signal." The signal output by the N-IFFT block 510 may be referred to as the "inverse FFT signal." The signal output by the CP block 512 may be referred to as the "Cyclic Prefix signal." The signal output by the WOLA block 514 may be referred to as the "weighted overlap-add signal."

In the example transmitter 500, the spectral shaping block 504 is between the modulator and the discrete Fourier transform circuit such that the first version of the input signal is the modulated input signal and the seconds version of the input signal is the spectral shaped signal. Additionally, in the example transmitter 500, performing the spectral shaping may include performing a circular convolution. The example transmitter 500 also includes a half-cyclic shift block (FFT shift) coupled to the discrete Fourier transform circuit. The FFT shift block 508 is a half-cycle cyclic shift block. For example, for an input vector of [1 2 3 4], after the half-cyclic shift/FFT-shift, the input vector becomes [3 4 1 2]. Additionally, the N point inverse fast Fourier transform circuit is coupled to the discrete Fourier transform circuit through a half-cyclic shift block. For the example transmitter 500, the first version of the input signal may be the modulated signal and the second version of the input signal may be the spectral shaped signal.

In the example transmitter 520, the spectral shaping block 524 is after the QAM modulation block 522 and the discrete Fourier transform circuit, M-DFT 526, such that the first version of the input signal is the M-point discrete Fourier transformed signal and the seconds version of the input signal is the modulated input signal. Additionally, in the example transmitter 520, performing the spectral shaping includes performing an element wise multiply. For the example transmitter 520, the first version of the input signal may be the M-DFT spread signal and the second version of the input signal may be the modulated signal.

The transmitter 520 may also include an N point inverse fast Fourier transform block 530 coupled to the spectral shaping block 524, a cyclic prefix circuit block, CP block 532, coupled to the WOLA block 534.

In the transmitter 520, the spectral shaping block 524 may be configured to perform a spectral shaping of an output of a discrete Fourier transform circuit (M-DFT) 526. Accordingly, in the transmitter 520, the spectral shaping block 524 may be configured to perform a spectral shaping of a discrete Fourier transformed and QAM modulated input signal of the transmitter 520. The QAM modulated output signal may be an output signal of the QAM modulation block 522. The discrete Fourier transformed QAM modulated output signal may be an output signal of the QAM modulation block 522.

Figure 6:
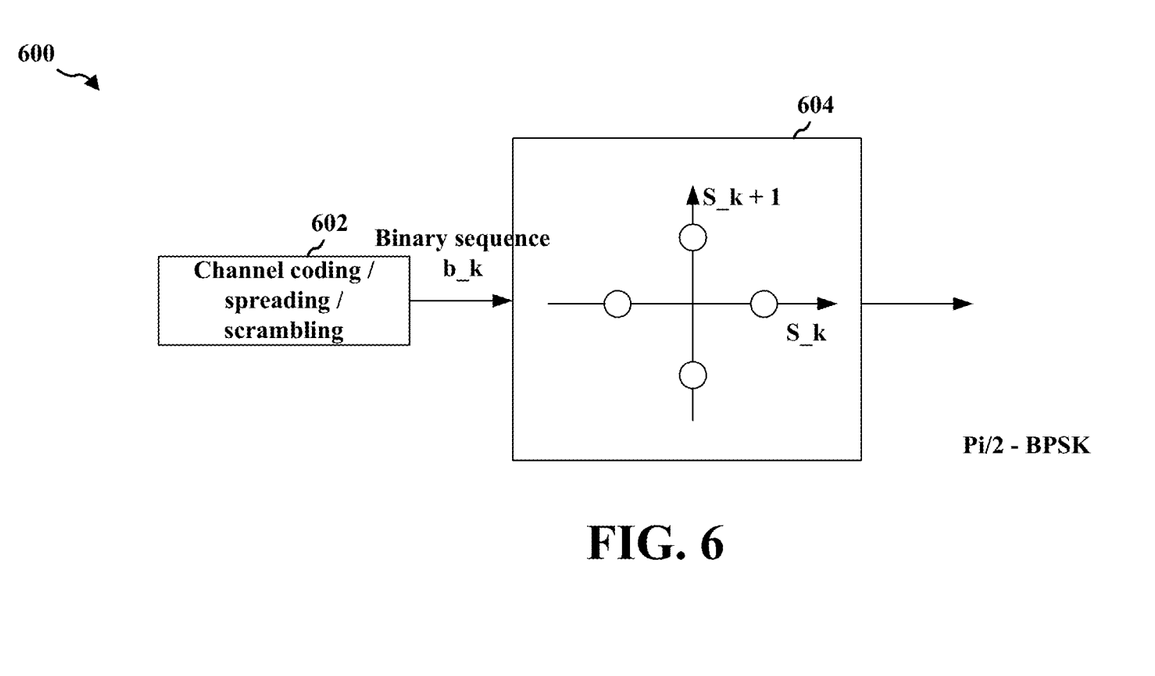
FIG. 6 is a diagram illustrating an example modulation.

FIG. 6 is a diagram 600 illustrating an example modulation, including a channel coding/spreading/scrambling block 602 and a modulator 604. The channel coding/spreading/scrambling block 602 may perform one or more of channel coding/spreading/scrambling on an input signal to be transmitted.

The modulator 604 may perform modulation on the signal output from the channel coding/spreading/scrambling block 602. The modulation may be, e.g., Pi/2 binary phase shift keying (BPSK). In the illustrated example of FIG. 6, the modulation is a low PAPR modulation scheme, Pi/2 BPSK. In other examples, the modulation may be regular modulation or low PAPR modulation (a modulation that preserves a low PAPR level). Example modulation schemes that may be used include, but not limited to: Quadrature Phase Shift Keying (QPSK), Offset QPSK (OQPSK), or other modulation schemes.

In one aspect, the spectral shaping block may be implemented before or after the DFT operation. For example, example transmitter 500 illustrates the spectral shaping block implemented before the DFT operation. Conversely, example transmitter 520 illustrates the spectral shaping block implemented after the DFT operation.

When the spectral shaping block occurs before the DFT block, the spectral shaping may be performed using a circular convolution and an FIR filter. The circular convolution with an FIR filter may be implemented using various FIR filters, including first order, second order, third order, or higher order filters. An example circular convolution with an FIR filter may be represented by the following example function, $$f(D)=0.28+1.0D+0.28D^2.$$

When the spectral shaping block is performed after the DFT block, the spectral shaping operation may be an element wise multiply with the frequency domain impulse response of the FIR filter. The element wise multiply with the FIR filter may use various FIR filters, including first order, second order, third order, or higher order filters. An example element wise multiply with the FIR filter may be represented by the following equation, $F(D)=DFT(0.28+1.0 D+0.28 D^2, M)$, where M is the number of assigned data tones or DFT size, i.e., the M symbol DFT, M-DFT.

In some aspects, existing demodulation circuitry, e.g., in existing receivers, may be used to demodulate signals generated using the systems and methods described herein. Demodulation may be comparable to regular SC-FDM demodulation. The spectral shaping filter at the transmitter may be absorbed into the channel (similar to increasing delay spread) and may be transparent to the receiver. The effect of the spectral shaping filter may be estimated through channel estimation at the receiver. Many legacy receivers may be used. Additionally, such legacy receivers may have increased performance (e.g., improved ability to demodulate signals poor SNR or otherwise poor quality signals) if such receivers include one or more of, a matched filter, a linear minimum mean square (LMMSE) equalizer, a maximal likelihood sequence estimator, or some other circuitry to account for the increased delay spread from the spectral shaping. Furthermore, aspects may utilize receivers which include one or more of a matched filter, an LMMSE equalizer, a maximal likelihood sequence estimator, or other circuitry to account for the increased delay spread from the spectral shaping.

Figure 7:
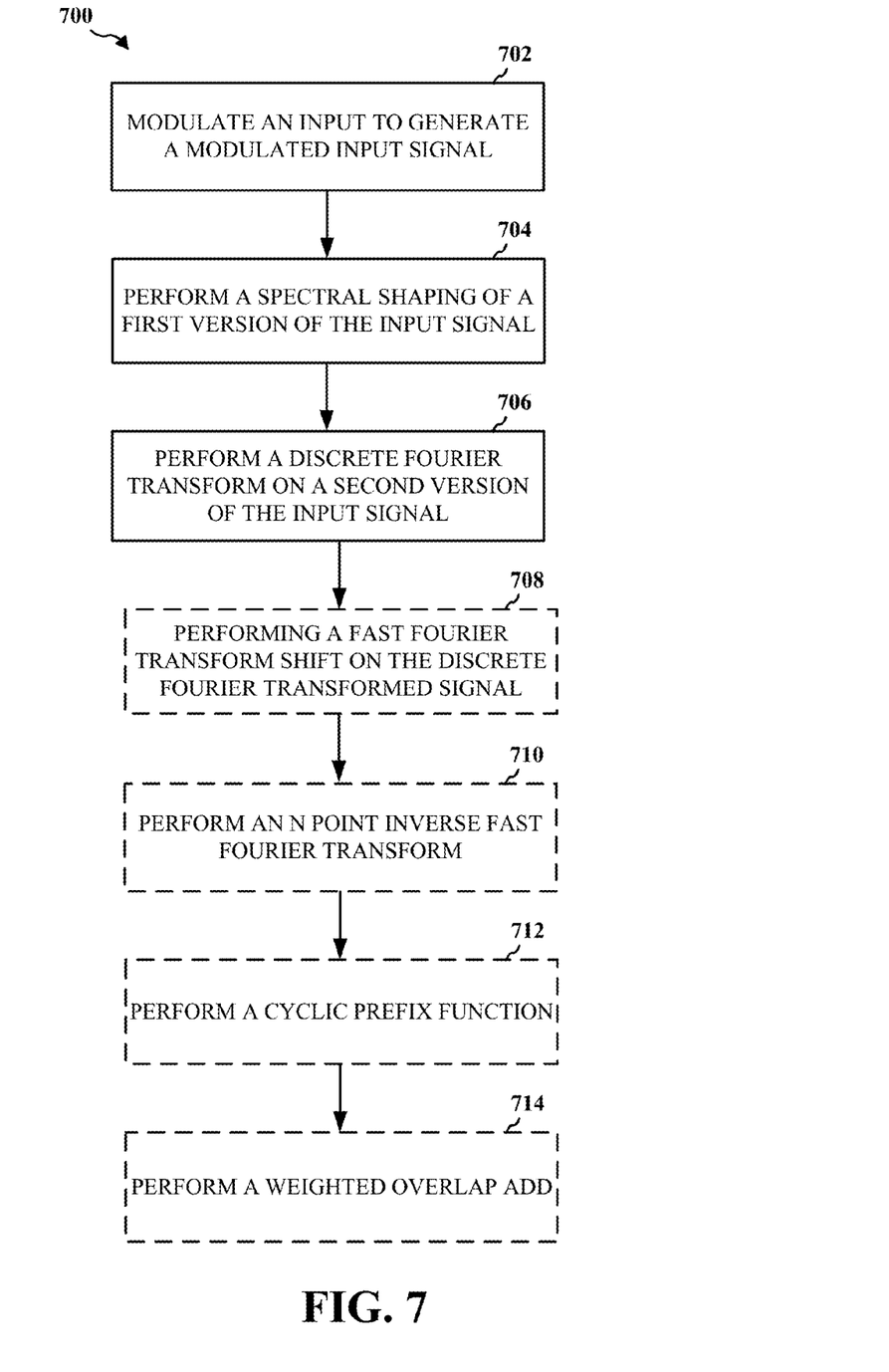
FIG. 7 is a flowchart of a method of wireless communication.

FIG. 7 is a flowchart 700 of a method of wireless communication. The method may be performed by a UE, eNB, or some other transmitting device. For example, the method may be performed by a IOE device. (e.g., the UE 104, 350). At 702, the UE may modulate a binary input sequence with a particular modulation coding scheme to generate a modulated input signal. For example, the UE 104, 350 modulates an input signal to generate a modulated input signal. More specifically, a modulator in the UE 104, 350 may modulate a binary input sequence with a particular modulation coding scheme to generate a modulated input signal. For example, a modulator in the UE may vary the amplitude, frequency, or phase of a carrier signal based on the binary input signal using the particular coding scheme, e.g., for the transmission of the binary input sequence.

At 704, the UE performs a spectral shaping of a first version of the input signal to generate a spectral shaped signal. The spectral shaping function may be performed either as a FIR filtering of the input signal before the DFT operation, where the filtering is performed in a circular fashion on the wrapped around input signal, or equivalently, as an element-wise scalar multiplication of the signal after the DFT. Note that due to the limited input alphabet size, the input convolution function may be implemented as a simple look up table. For example, for a 3-tap FIR filter with binary input, a $2^3=8$-element look up table may suffice, which may avoid the need for any complex multiplications. In order to avoid the need for any complex multiplication, it may be more advantageous to use pre-DFT convolution instead of post-DFT scalar multiplication. The spectral shaping includes FIR filtering configured to lower peak-to-average power ratio of the spectral shaped signal. For example, the UE 104, 350 performs a spectral shaping of a first version of the input signal to generate a spectral shaped signal. More specifically, a spectral shaping circuit in the UE 104, 350 may perform the spectral shaping of the first version of the input signal to generate a spectral shaped signal. The spectral shaping circuit may include an FIR filtering configured to lower peak-to-average power ratio of the spectral shaped signal.

At 706, a UE performs a M-point discrete Fourier transform on a second version of the input signal to generate a discrete Fourier transformed signal. For example, a UE 104, 350 performs a M-point discrete Fourier transform on a second version of the input signal to generate a discrete Fourier transformed signal. More particularly, a discrete Fourier transform circuit performs a M-point discrete Fourier transform on a second version of the input signal to generate a discrete Fourier transformed signal. The second version of the input signal may be the output of the spectral shaping block 504, e.g., which may perform the spectral shaping at 704.

At 708, a UE may perform a fast Fourier transform shift on the discrete Fourier transformed signal. For example, a UE 104, 350 may perform a fast Fourier transform shift on the discrete Fourier transformed signal. More particularly, a Fourier transform circuit may perform a Fourier transform on the discrete Fourier transformed signal. An example may perform a fast Fourier transform shift on the discrete Fourier transformed signal, where the fast Fourier transform shift includes a Pi/2 binary phase shift keying (Pi/2 BPSK) modulation At 710, a UE may perform an N point inverse fast Fourier transform. For example, a UE 104, 350 may perform an N point inverse fast Fourier transform. More specifically, inverse fast Fourier circuitry in the UE 104, 350 may perform inverse fast Fourier transforms.

At 712, a UE may perform a cyclic prefix operation. For example, a UE 104, 350 may perform a cyclic prefix operation. More specifically, cyclic prefix circuitry in the UE 104, 350 may perform a cyclic prefix operation.

At 714, a UE may perform a weighted overlap add operation. For example, a UE 104, 350 may perform a weighted overlap add operation. More specifically, weighted overlap add circuitry may perform a weighted overlap add.

In a first aspect, the spectral shaping occurs after the modulation and the discrete Fourier transforming. Accordingly, the first version of the input signal is the discrete Fourier transformed signal and the seconds version of the input signal is the modulated input signal. Furthermore, the modulating may include QAM modulating.

For example, the input of the spectral shaping circuit may be coupled to the output of the modulator and the output of the spectral shaping circuit may be coupled to the input of the discrete Fourier transform circuit such that the first version of the input signal is the modulated input signal and the second version of the input signal is the spectral shaped signal.

In a second aspect, the spectral shaping occurs after performing the modulation and the performing the M-point discrete Fourier transforming. Accordingly, the first version of the input signal is the discrete Fourier transformed signal and the second version of the input signal is a modulated input signal. Again, the modulating may include QAM modulating.

For example, the input of the discrete Fourier transform may be coupled to the output of the modulator and the input of the spectral shaping circuit may be coupled to the output of the discrete Fourier transform circuit such that the first version of the input signal is a M-point discrete Fourier transformed signal and the second version of the input signal is the modulated input signal.

Referring back to FIG. 5, in an example, a transmitter 500, 520 includes means for modulating a binary input sequence with a particular modulation coding scheme to generate a modulated input signal (e.g., FIG. 5, QAM modulation block 502, 522). The transmitter 500, 520 includes means for performing a spectral shaping (e.g., FIG. 5, spectral shaping block 504, 524) of a first version of the input signal to generate a spectral shaped signal. The spectral shaping may include an FIR filter configured to lower peak-to-average power ratio of the spectral shaped signal. The transmitter 500, 520 also includes means for performing a M-point discrete Fourier transforming of a second version of the input signal to generate a discrete Fourier transformed signal (e.g., FIG. 5, M-DFT block 506, 526).

In an example, the means for performing the spectral shaping (504) is between the means for modulating (502) and the means for performing the M-point discrete Fourier transforming (506) such that the first version of the input signal is the modulated input signal and the seconds version of the input signal is the spectral shaped signal. Performing the spectral shaping may include performing a circular convolution. An example may include a means for performing a fast Fourier transform (or FFT shift) on the discrete Fourier transformed signal (e.g., FIG. 5, FFT shift block 508).

In an example, the means for spectral shaping (524) is after the means for modulating (522) and the means for M-point discrete Fourier transforming (526) such that the first version of the input signal is the discrete Fourier transformed signal and the seconds version of the input signal is the modulated input signal. Performing the spectral shaping may include performing an element wise multiply.

An example may include means for performing an N point inverse fast Fourier transform (e.g., FIG. 5, N-IFFT block 510, 530), means for performing a cyclic prefix (e.g., FIG. 5, CP block 512 532), and means for performing a weighted overlap add (e.g., FIG. 5, WOLA block 514, 534). Additionally, the means for modulating (502, 522) may include a quadrature amplitude modulation (QAM) modulator.

It is understood that the specific order or hierarchy of blocks in the processes/flowcharts disclosed is an illustration of exemplary approaches. The specific order or hierarchy of blocks in the processes/flowcharts may be rearranged based upon design preferences. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of transmitting, comprising:
    modulating a binary input sequence with a particular modulation coding scheme to generate a modulated input signal;
    performing a spectral shaping of a first version of a input signal to generate a spectral shaped signal, the spectral shaping including a finite input response (FIR) filtering configured to lower peak-to-average power ratio of the spectral shaped signal; and
    performing a M-point discrete Fourier transforming of a second version of the input signal to generate a discrete Fourier transformed signal,
    wherein the modulated input signal is one of the first version of the input signal or the second version of the input signal and the spectral shaped signal is another of the first version of the input signal or the second version of the input signal and wherein performing the spectral shaping occurs between the modulating and performing the M-point discrete Fourier transforming such that the first version of the input signal is the modulated input signal and the second version of the input signal is the spectral shaped signal.

2. The method of claim 1, wherein performing the spectral shaping comprises performing a circular convolution.

3. The method of claim 1, further comprising performing a fast Fourier transform shift on the discrete Fourier transformed signal, the fast Fourier transform shift comprising a half-cyclic shift.

4. The method of claim 1, further comprising performing an N point inverse fast Fourier transform, performing a cyclic prefix, and performing a weighted overlap add.

5. The method of claim 1, wherein the particular modulation coding scheme comprises one of quadrature amplitude modulation (QAM) modulating or Pi/2 binary phase shift keying (Pi/2 BPSK) modulation.

6. A transmitter for transmitting a wireless signal, comprising:
    a modulator configured to modulate a binary input sequence with a particular modulation coding scheme to generate a modulated input signal;
    a spectral shaping circuit configured to perform a spectral shaping of a first version of an input signal to generate a spectral shaped signal, the spectral shaping circuit including a finite input response (FIR) filter configured to lower peak-to-average power ratio of the spectral shaped signal; and
    a discrete Fourier transform circuit configured to discrete Fourier transform a second version of the input signal to generate a discrete Fourier transformed signal,
    wherein the modulated input signal is one of the first version of the input signal or the second version of the input signal and the spectral shaped signal is another of the first version of the input signal or the second version of the input signal and wherein an input of the spectral shaping circuit is coupled to an output of the modulator and an output of the spectral shaping circuit is coupled to an input of the discrete Fourier transform circuit such that the first version of the input signal is the modulated input signal and the second version of the input signal is the spectral shaped signal.

7. The transmitter of claim 6, wherein performing the spectral shaping comprises performing a circular convolution.

8. The transmitter of claim 6, further comprising a half-cyclic shift block coupled to the discrete Fourier transform circuit.

9. The transmitter of claim 6, wherein the modulator comprises a quadrature amplitude modulation (QAM) modulator.

10. The transmitter of claim 6, wherein the modulation coding scheme comprises a Pi/2 binary phase shift keying (Pi/2 BPSK) modulation.

11. A transmitter for transmitting a wireless signal, comprising:
a modulator configured to modulate a binary input sequence with a particular modulation coding scheme to generate a modulated input signal;
a spectral shaping circuit configured to perform a spectral shaping of a first version of an input signal to generate a spectral shaped signal, the spectral shaping circuit including a finite input response (FIR) filter configured to lower peak-to-average power ratio of the spectral shaped signal;
a discrete Fourier transform circuit configured to discrete Fourier transform a second version of the input signal to generate a discrete Fourier transformed signal,
wherein the modulated input signal is one of the first version of the input signal or the second version of the input signal and the spectral shaped signal is another of the first version of the input signal or the second version of the input signal; and
an N point inverse fast Fourier transform circuit coupled to the discrete Fourier transform circuit, a cyclic prefix circuit coupled to the N point inverse fast Fourier transform circuit, and a weighted overlap add circuit coupled to the cyclic prefix circuit, wherein the N point inverse fast Fourier transform circuit is coupled to the discrete Fourier transform circuit through a half-cyclic shift block.

12. The transmitter of claim 11, wherein the N point inverse fast Fourier transform circuit is coupled to the discrete Fourier transform circuit through the spectral shaping circuit.

13. A transmitter, comprising:
means for modulating a binary input sequence with a particular modulation coding scheme to generate a modulated input signal;
means for performing a spectral shaping of a first version of an input signal to generate a spectral shaped signal, the spectral shaping including a finite input response (FIR) filter configured to lower peak-to-average power ratio of the spectral shaped signal; and
means for performing a M-point discrete Fourier transforming of a second version of the input signal to generate a discrete Fourier transformed signal,
wherein the modulated input signal is one of the first version of the input signal or the second version of the input signal and the spectral shaped signal is another of the first version of the input signal or the second version of the input signal and wherein the means for performing the spectral shaping is between the means for modulating and the means for performing the M-point discrete Fourier transforming such that the first version of the input signal is the modulated input signal and the second version of the input signal is the spectral shaped signal.

14. The transmitter of claim 13, wherein performing the spectral shaping comprises performing a circular convolution.

15. The transmitter of claim 13, further comprising means for performing a fast Fourier transform on the discrete Fourier transformed signal.

16. The transmitter of claim 13, further comprising means for performing an N point inverse fast Fourier transform, means for performing a cyclic prefix, and means for performing a weighted overlap add.

17. The transmitter of claim 13, wherein the means for modulating comprises quadrature amplitude modulation (QAM) modulator.

18. A non-transitory computer-readable medium storing computer executable code, comprising code to:
modulate a binary input sequence with a particular modulation coding scheme to generate a modulated input signal;
perform a spectral shaping of a first version of a input signal to generate a spectral shaped signal, the spectral shaping including a finite input response (FIR) filtering configured to lower peak-to-average power ratio of the spectral shaped signal; and
perform a M-point discrete Fourier transforming of a second version of the input signal to generate a discrete Fourier transformed signal,
wherein the modulated input signal is one of the first version of the input signal or the second version of the input signal and the spectral shaped signal is another of the first version of the input signal or the second version of the input signal and wherein performing the spectral shaping occurs between the modulating and performing the M-point discrete Fourier transforming such that the first version of the input signal is the modulated input signal and the second version of the input signal is the spectral shaped signal.

19. The non-transitory computer-readable medium of claim 18, wherein the code to perform the spectral shaping comprises code to perform a circular convolution.

20. A method of transmitting, comprising:
modulating a binary input sequence with a particular modulation coding scheme to generate a modulated input signal;
and
performing a M-point discrete Fourier transforming of a second version of the input signal to generate a discrete Fourier transformed signal;
performing a spectral shaping of a first version of a input signal to generate a spectral shaped signal, the spectral shaping including a finite input response (FIR) filtering configured to lower peak-to-average power ratio of the spectral shaped signal; and
performing an N point inverse fast Fourier transform;
wherein the modulated input signal is one of the first version of the input signal or the second version of the input signal and the spectral shaped signal is another of the first version of the input signal or the second version of the input signal and wherein performing the spectral shaping occurs after performing the modulation and after performing the M-point discrete Fourier transforming such that the first version of the input signal is the discrete Fourier transformed signal and the second version of the input signal is the modulated input signal and immediately before the N point inverse fast Fourier transform.

21. The method of claim 20, wherein performing the spectral shaping comprises performing an element wise multiply.

22. The method of claim 20, further comprising performing a fast Fourier transform shift on the discrete Fourier transformed signal, the fast Fourier transform shift comprising a half-cyclic shift.

23. The method of claim 20, wherein the particular modulation coding scheme comprises one of quadrature amplitude modulation (QAM) modulating or Pi/2 binary phase shift keying (Pi/2 BPSK) modulation.

* * * * *